US008725878B1

(12) United States Patent
Gillam et al.

(10) Patent No.: US 8,725,878 B1
(45) Date of Patent: May 13, 2014

(54) METHOD AND APPARATUS FOR TOPOLOGY DRIVEN ZONING

(75) Inventors: David A. Gillam, The Colony, TX (US);
Ameer M. Jabbar, Lilburn, GA (US);
Anurag Jain, Murphy, TX (US);
Stephen A. Mendes, Wellesley, MA (US); Sukesh Kumar Biddappa, Murphy, TX (US)

(73) Assignee: EMC Corporation, Hopkinton, MA (US)

( * ) Notice: Subject to any disclaimer, the term of this patent is extended or adjusted under 35 U.S.C. 154(b) by 246 days.

(21) Appl. No.: 13/435,049

(22) Filed: Mar. 30, 2012

(51) Int. Cl.
*G06F 15/16* (2006.01)
*G06F 12/00* (2006.01)

(52) U.S. Cl.
USPC ........................................................ 709/226

(58) Field of Classification Search
CPC ..... G06F 3/067; G06F 3/0635; G06F 3/0607;
G06F 3/0605; G06F 3/0659; G06F 11/201;
G06F 3/0613; G06F 3/0647; G06F 21/78;
G06F 3/0629; G06F 11/3409; G06F 11/3433;
G06F 11/3485; G06F 2201/81
USPC .................................. 709/203, 223–229, 250
See application file for complete search history.

(56) References Cited

U.S. PATENT DOCUMENTS

| 8,386,610 | B2 * | 2/2013 | Yahalom et al. | 709/226 |
|---|---|---|---|---|
| 2003/0177217 | A1 * | 9/2003 | Asaka et al. | 709/223 |
| 2006/0074927 | A1 * | 4/2006 | Sullivan et al. | 707/100 |
| 2011/0314222 | A1 * | 12/2011 | Maroney et al. | 711/114 |
| 2012/0177041 | A1 * | 7/2012 | Berman | 370/392 |
| 2012/0278584 | A1 * | 11/2012 | Nagami et al. | 711/170 |

OTHER PUBLICATIONS

U.S. Appl. No. 13/628,661, filed Sep. 27, 2012, Tahaliyani, et al.
Vblock Infrastructure Platforms Series 300 Architecture Overview, Version 2.4, Aug. 2011, The Virtual Computing Environment Company, www.vce.com, 74 pages.
Cisco Unified Computing System and EMC VNXe3300 Unified Storage System, White Paper, Jan. 2011, Revision 1.0, EMC[2], Cisco Systems, Inc., 170 West Tasman Drive, San Jose, CA 95134-1706, www.cisco.com, 9 pages.
EMC Integrated Infrastructure for VMware Enabled by EMC VNXe3100 and VMware vSphere 4.1, An Architectural Overview, White Paper, EMC Global Solutions, EMC[2], Feb. 2011, 24 pages.
VMware vStorage APIs for Array Integration with EMC VNX Series for NAS, Benefits of EMC VNX for File Integration with VMware VAAI, White Paper, EMC Solutions Group, Jan. 2012, EMC[2], 17 pages.
Vblock™ Infrastructure Platforms 2010 Vblock Platforms Architecture Overview, Version 1.3, Nov. 2011, The Virtual Computing Environment Company, www.vce.com, 25 pages.
Best Practices for Deploying VMware vCloud Director on Vblock Infrastructure Platforms, Sep. 2011, The Virtual Computing Environment Company, www.vce.com, 20 pages.

(Continued)

*Primary Examiner* — Zarni Maung
(74) *Attorney, Agent, or Firm* — Daly, Crowley, Mofford & Durkee, LLP

(57) ABSTRACT

Methods and apparatus to create zones for ports from a storage layer to a compute layer both coupled to a storage area network switch. In one embodiment, the storage layer includes ports in field replaceable unit (FRU) port groups, the port groups in FRU adapters, and the adapters in FRU adapter groups. The ports can be selected to minimize single points of failure.

19 Claims, 10 Drawing Sheets

(56) References Cited

OTHER PUBLICATIONS

Service Catalog Strategies for Vblock™ Infrastructure Platforms, IaaS COE, Jan. 2011, The Virtual Computing Environment Company, www.vce.com, 19 pages.

Unified Infrastructure Manager/Provisioning, © 2011 VCE Company, The Virtual Computing Environment Company, www.vce.com, 3 pages.

Vblock™ Infrastructure Platforms Technical Overview, © 2011 VCE Company, The Virtual Computing Environment Company, www.vce.com, 8 pages.

Vblock™ Solution for Trusted Multi-Tenancy: Technical Overview, Aug. 2011, The Virtual Computing Environment Company, www.vce.com, 75 pages.

U.S. Appl. No. 13/628,661, filed Sep. 27, 2012.

* cited by examiner

METHOD AND APPARATUS FOR TOPOLOGY DRIVEN ZONING

BACKGROUND

As is known in the art, storage systems, such as so-called cloud storage, contain a large number of hardware devices and components and software applications, modules, and components. When configuring a computer system ("host") to communicate with a storage array ("array") across a fabric using the Fibre Channel protocol, it is common to configure 'zones' as a security measure to control which hosts are able to communicate with which arrays. A zone contains multiple 'zone-members', each of which is represented as a pair of unique identifiers (known as World-Wide-Names, or WWNs), one on the host port and one on the array port, between which traffic is allowed to flow. The WWNs are associated with ports on both the host and array, and thus dictate which ports are allowed to communicate. The number of zone members and the selection of the ports are typically carried out manually according to best practices as determined by specific architecture and environment.

SUMMARY

In one aspect of the invention, a method comprises: creating zones for ports from a storage layer to a compute layer both coupled to a storage area network switch, wherein the storage layer includes ports in field replaceable unit (FRU) port groups, the port groups in FRU adapters, and the adapters in FRU adapter groups; creating a first zone; and creating a second zone immediately after the first zone by: identifying a storage adapter that is not in the last adapter group used for the first zone; and identifying a storage port that is not in the last port group used for the first zone.

In another aspect of the invention, an article comprises: a computer readable medium having non-transitory stored instructions that enable a machine to perform: creating zones for ports from a storage layer to a compute layer both coupled to a storage area network switch, wherein the storage layer includes ports in field replaceable unit (FRU) port groups, the port groups in FRU adapters, and the adapters in FRU adapter groups; creating a first zone; creating a second zone immediately after the first zone by: identifying a storage adapter that is not in the last adapter group used for the first zone; and identifying a storage port that is not in the last port group used for the first zone.

In a further aspect of the invention, a system comprises: a compute layer; a storage layer;
a network layer between the compute layer and the storage layer; and a management layer comprising stored instructions to enable the system to: create zones for ports from the storage layer to the compute layer, wherein the storage layer includes ports in field replaceable unit (FRU) port groups, the port groups in FRU adapters, and the adapters in FRU adapter groups; create a first zone; create a second zone immediately after the first zone by: identify a storage adapter that is not in the last adapter group used for the first zone; and identify a storage port that is not in the last port group used for the first zone.

BRIEF DESCRIPTION OF THE DRAWINGS

The foregoing features of this invention, as well as the invention itself, may be more fully understood from the following description of the drawings in which.

DETAILED DESCRIPTION

Figure 1:
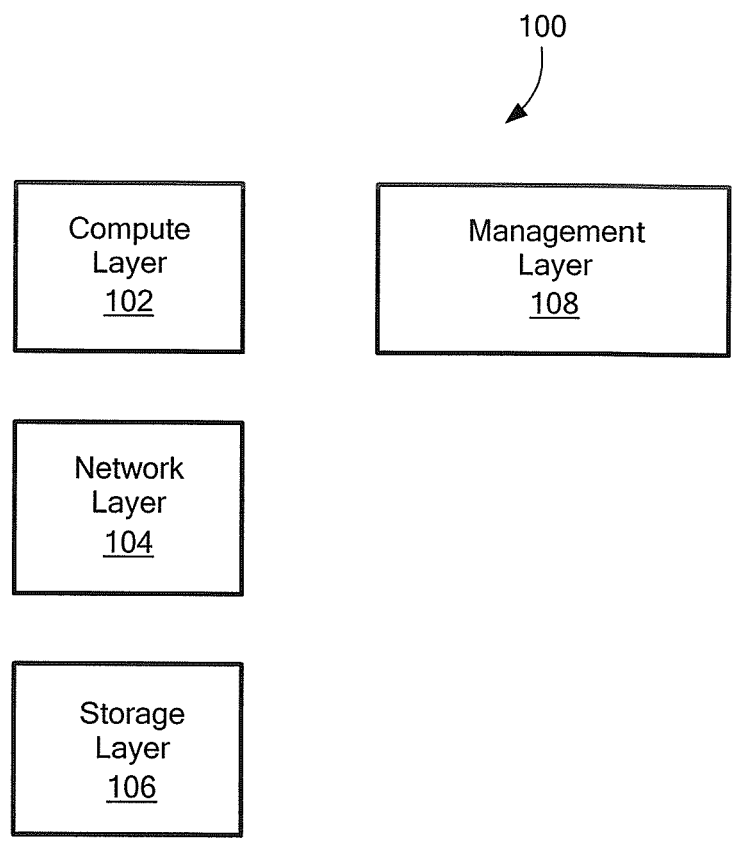
FIG. 1 is a high level schematic representation of a cloud storage system having topology driven zoning in accordance with exemplary embodiments of the invention.

FIG. 1 shows an exemplary cloud storage environment 100 having a compute layer 102, a network layer 104, a storage layer 106, and a management layer 108. The environment may be referred to as a platform. It is understood that any practical number of platforms can be combined into a cloud storage environment.

The compute layer 102 comprises components, such as blade servers, chassis and fabric interconnects that provide the computing power for the platform. The storage layer 106 comprises the storage components for the platform. The network layer 104 comprises the components that provide switching and routing between the compute and storage layers 102, 106 within and between platforms, and to the client or customer network.

Figure 2:
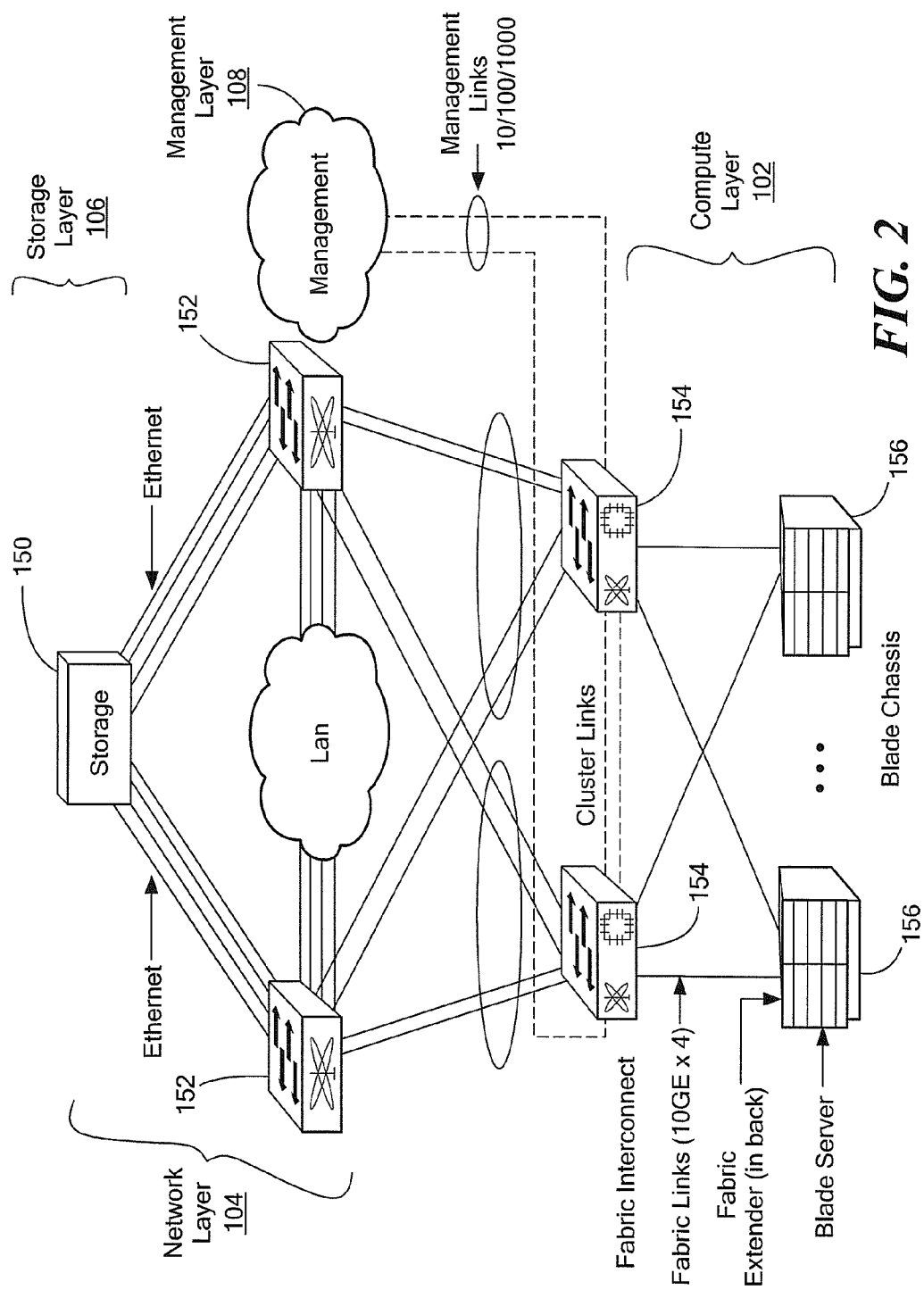
FIG. 2 is a schematic representation showing further detail of the cloud storage system of FIG. 1 including interconnections.

FIG. 2 shows further detail for the environment 100 of FIG. 1. The storage layer 106 can include storage components 150, such as CLARIION storage components from EMC Corporation of Hopkinton Mass. The network layer 104 can include a pair of switches 152, such as MDS 9000 Series Multilayer SAN Switches from Cisco of San Jose, Calif., coupled to the storage components and to a LAN. The compute layer 102 can include a pair of fabric interconnects 154, such as CISCO 6100 series devices. The compute layer can further include a number of blade servers 156, such as CISCO 5100 blade chassis. The management layer 108 can be coupled to the compute layer 102.

Figure 3:
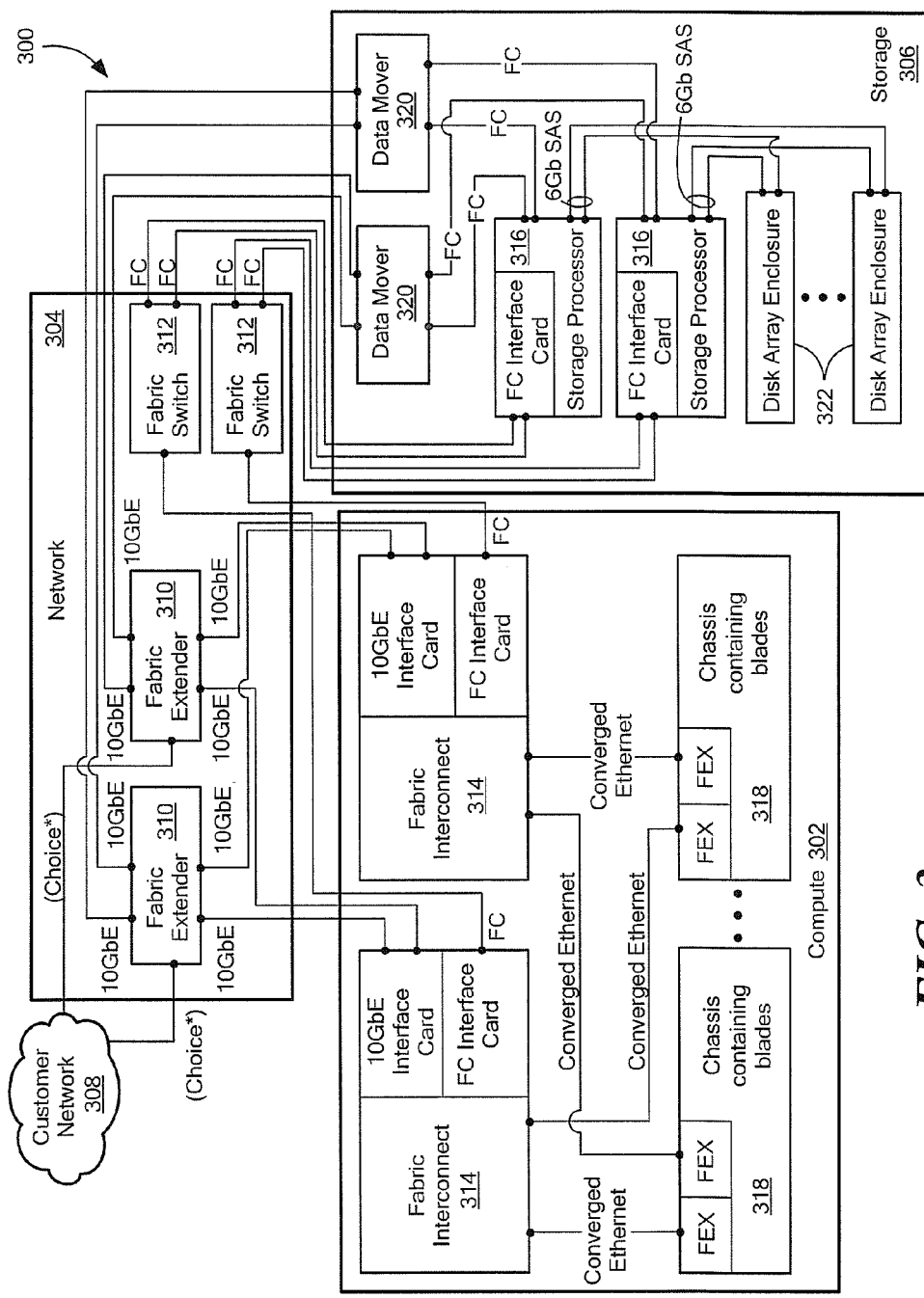
FIG. 3 is a schematic representation showing further detail of the cloud storage system of FIG. 2 including system components.
Figure 4:
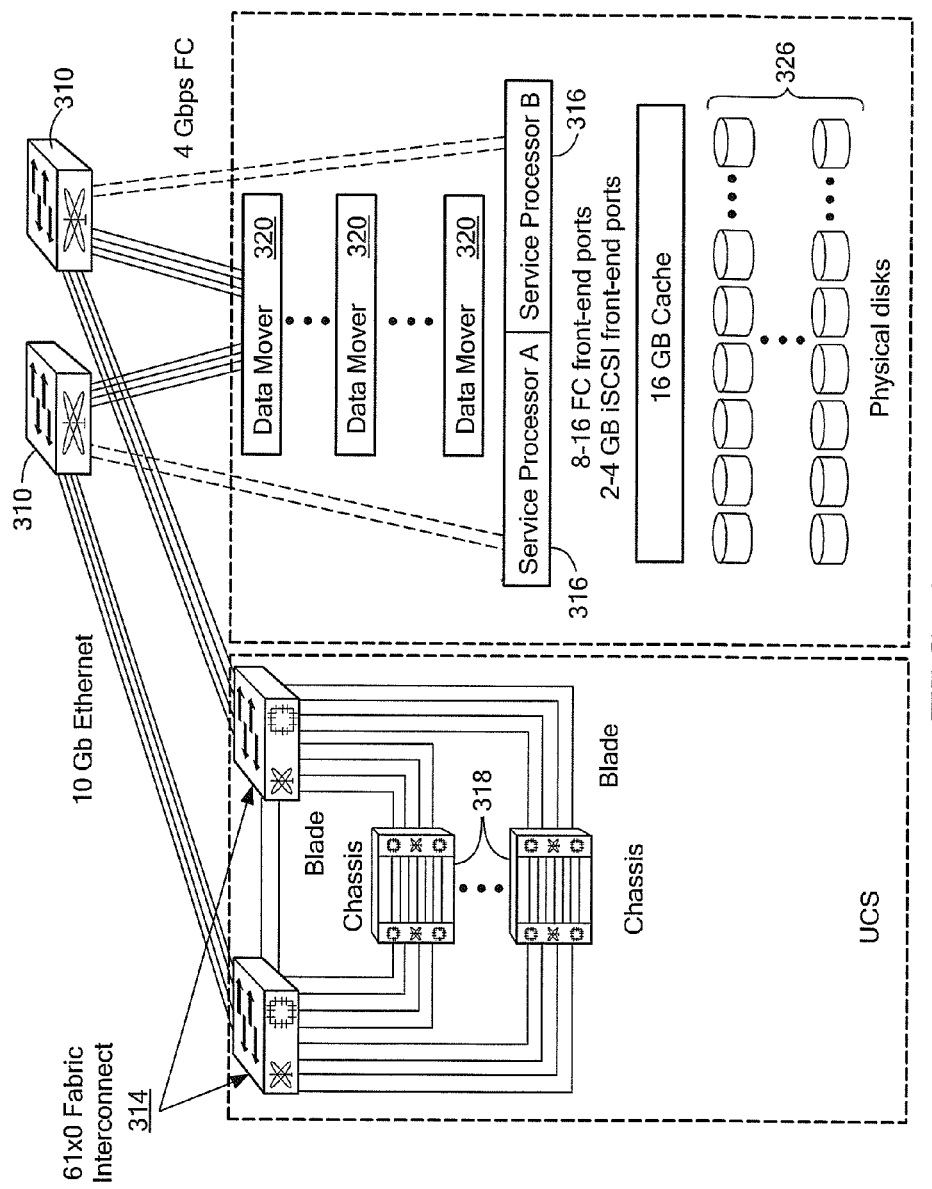
FIG. 4 is a schematic representation showing further detail of a storage layer of the cloud storage system of FIG. 3 using NAS for the storage layer.

FIG. 3 shows further detail of an exemplary cloud environment having a compute layer 302, a network layer 304 and a storage layer 306. The network layer 302 is coupled to a customer network 308 in a manner known in the art. The network layer 302 includes switches 310 coupled to the customer network 308. The network layer 302 also includes multilayer fabric switches 312 coupled to fabric interconnects 314 in the compute layer 302 and to storage processors 316 in the storage layer 306. The fabric interconnects 314 are coupled to blade server chassis 318 containing blades. Data movers 320 in the storage layer 306 are coupled between the storage processors 316 and the switches 310 in the network layer. Disk array enclosures 322 are coupled to the storage processors 316. FIG. 4 shows interconnections for a system similar to that shown in FIG. 3 with physical disks 326. In the illustrated embodiment, the storage layer includes 8 to 16 front end fibre channel ports and 2-4 GB iSCSI front end ports.

It is understood that a variety of other configurations having different interconnections and storage configuration can be provided to meet the needs of a particular application.

The management layer can include a number of applications to perform various functions for overall control, configuration, etc of the various platform components. For example, management applications can include a virtualization function, such as vSphere/vCenter, by VMware of Palto Alto, Calif. A further management application can be provided as part of the Unified Computing System (UCS) by Cisco. It is understood that the blade chassis and fabric interconnection can be considered part of the UCS. Another management application can include a management interface, such as EMC Unisphere, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

Figure 5:
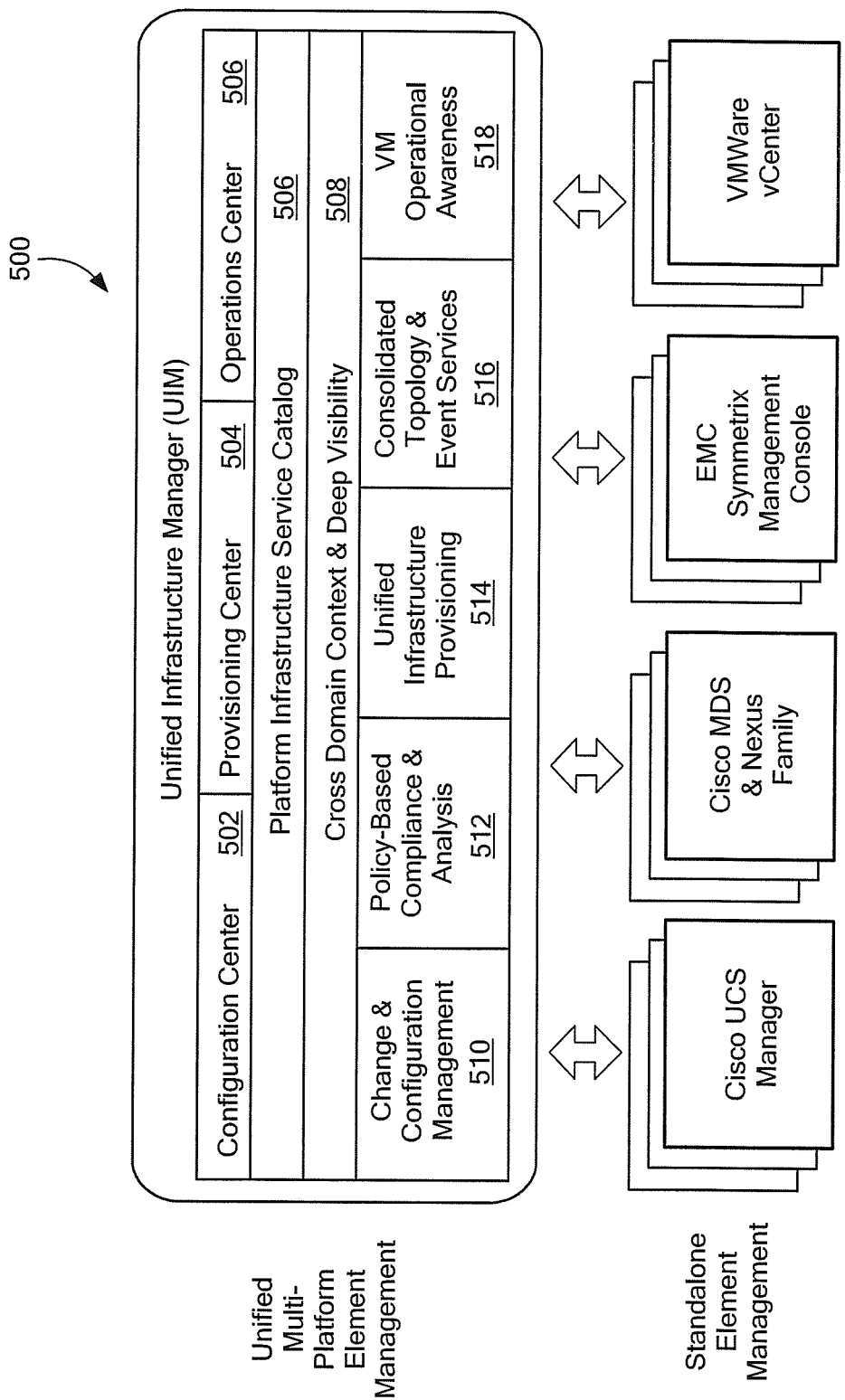
FIG. 5 is a schematic representation of a unified infrastructure manager (UIM) module showing component layering or stack.

FIG. 5 shows an exemplary unified infrastructure manager 500 having topology driven zoning in accordance with exemplary embodiments of the invention. In an exemplary embodiment, the unified infrastructure manager 500 includes a configuration center module 502, a provisioning center module 504, and an operations center module 506. Below these modules is a platform infrastructure service catalog 506 and a cross domain context and visibility module 508.

The Unified Infrastructure Manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage layers, and other management applications. The Unified Infrastructure Manager 500 performs platform deployment by abstracting the overall provisioning aspect of the platform(s) and offering granular access to platform components for trouble shooting and fault management.

In one aspect of the invention, a unified infrastructure management module performs port zoning based on the topology of the network. In general, the system automatically configures the optimum Fibre Channel zones for a managed service involving a storage array (e.g. EMC Symmetrix) connected to a blade server system (e.g.: Cisco UCS), including persistence of that zoning plan for the lifetime of the managed service, i.e., "port affinity," in order to provide seamless expansion of the service. Exemplary embodiments of the invention ensure that sufficient paths exist between host and array to accommodate the expected traffic, minimization of single-points-of-failure in the overall host-to-array communication, load balancing of the traffic across the zone-members (and ports) between host and array, and reuse of the same array ports for all hosts.

Figure 6:
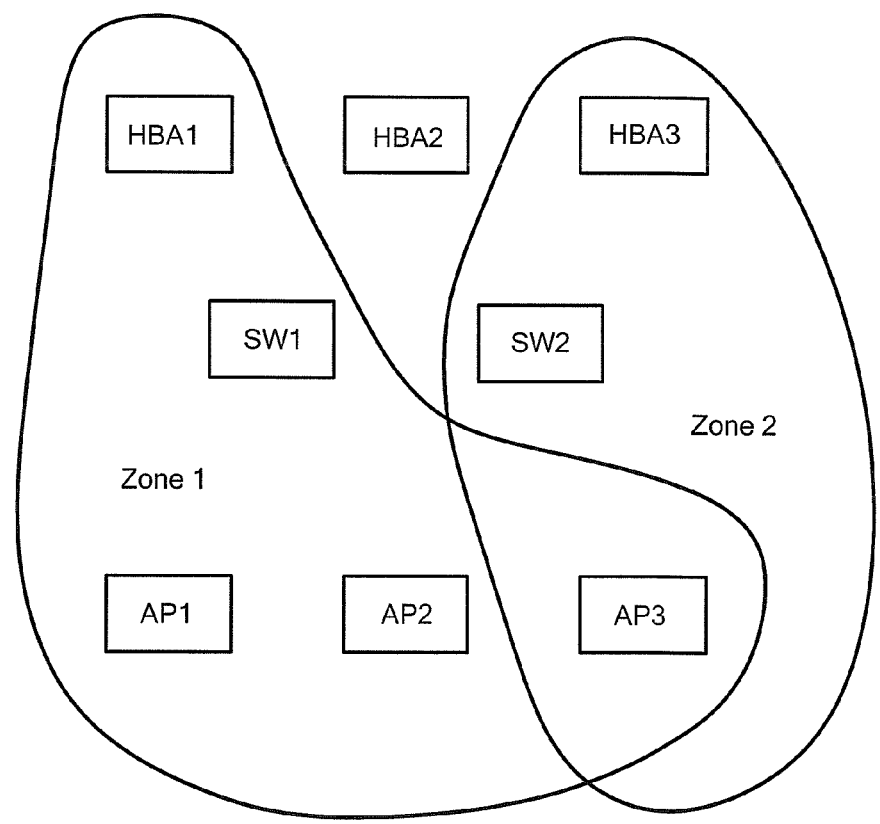
FIG. 6 is a schematic representation of zoning between a storage array and a host.

As is known in the art, zoning can be implemented in a storage area network (SAN) to mitigate security risks controlling access between objects on the SAN. By creating and managing zones, host access to storage resources can be controlled. In general, objects, such as ports, that can access each other are within a given zone. It is understood that zones can overlap. Zones are implemented by using zoning table in the SAN switches. Fabric zoning is defined at the port level. FIG. 6 shows a first zone ZONE1 and a second zone ZONE2. As can be seen, a first switch SW1 in the first zone ZONE1 enables array ports AP1-3 to access a first host port HBA1 and a second switch SW2 enables the third array port AP3 to access the third host port HBA3.

Figure 7:
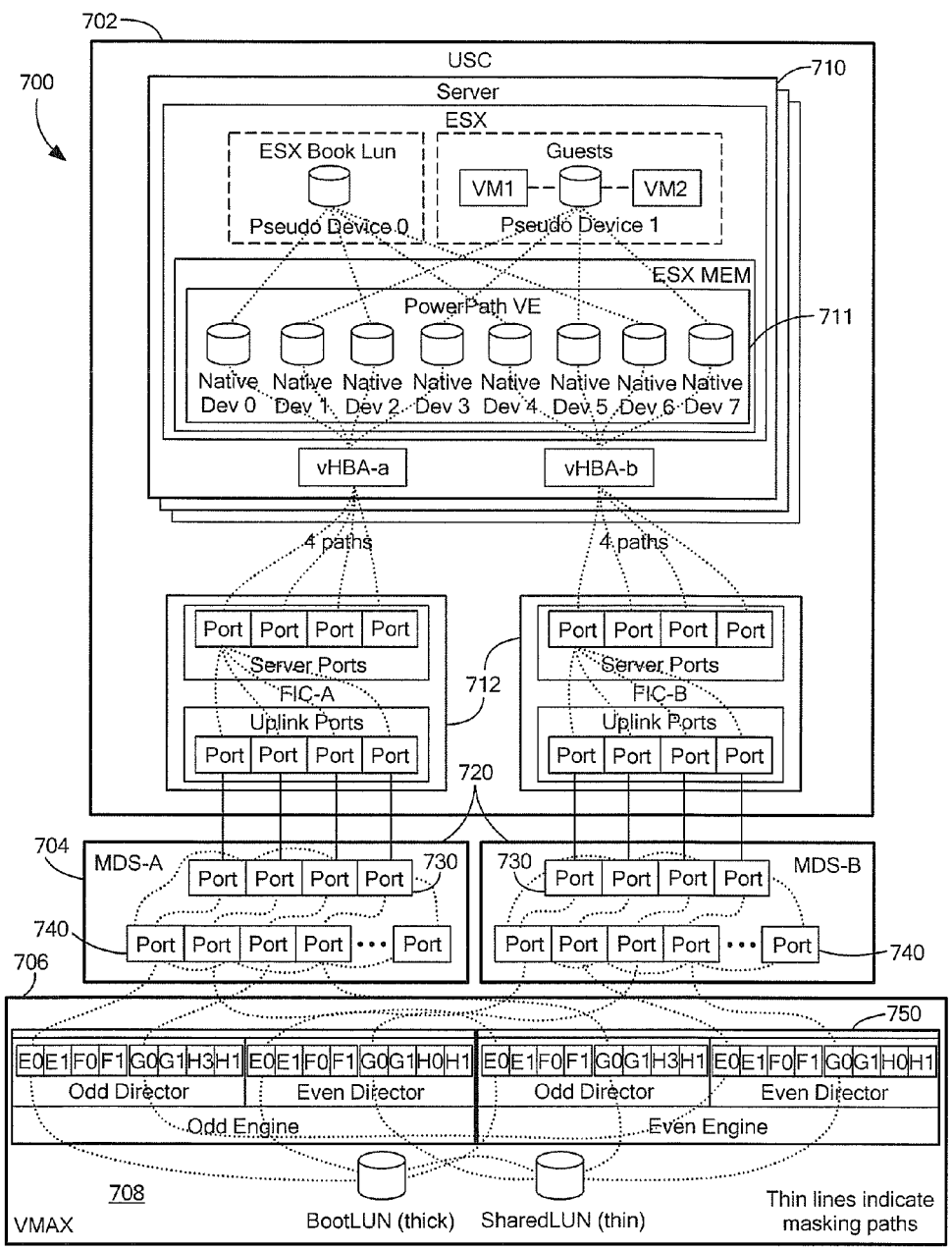
FIG. 7 is a schematic representation of zoning for a computer layer and a storage layer for minimizing single-point-of-failure.

FIG. 7 shows an exemplary storage environment 700 comprising a compute layer 702, a network layer 704 and a storage layer 706. In an exemplary embodiment, the computer layer 702 can be provided as Cisco UCS. In one embodiment, the UCS 702 includes a server 710 with a load balancing function, which can be provided by Power Path of EMC 711. The compute layer further includes fabric interconnects 712, such as Cisco UCS 61xD devices.

The network layer 704 comprises SAN switches 720, such as Cisco MDS 9148 storage switches. The storage layer 706 includes arrays 708, such as EMC Symmetrix or VNX 5300 storage arrays. The SAN switches 720 have ports 730 coupled to the fabric interconnect devices 712 and ports 740 coupled to ports 750 of the storage array.

Figure 7A:
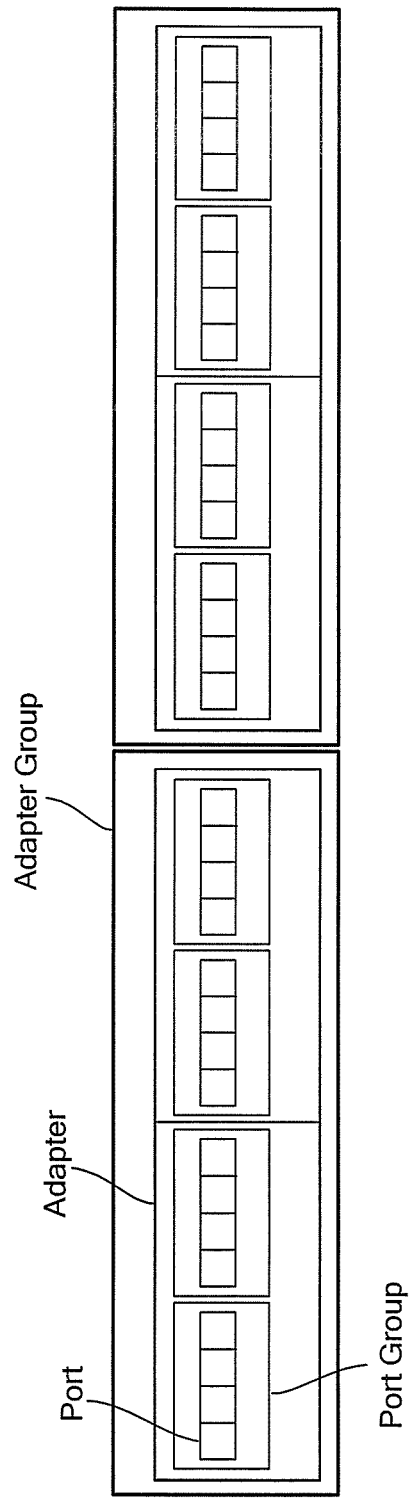
FIG. 7A is a schematic representation of an exemplary multiple field replaceable unit (FRU) embodiment.

In the illustrated embodiment, which utilizes Cisco UCS and EMC Symmetrix VMAX architectures, the ports are grouped hierarchically into components that fail independently. As shown in the exemplary embodiment of FIG. 7A, each group of four array ports make up a field replaceable unit (FRU) referred to generically as a 'port group'. The port groups are grouped into FRUs referred to as 'adapters' (specifically called 'directors' on EMC Symmetrix arrays. The adapters are further grouped into FRUs referred to as 'adapter groups' (or 'engines' on Symmetrix).

The desired outcome is illustrated in FIG. 7 where the compute layer 702 (UCS) is zoned through the network layer 704 (SAN switches 720) down to the ports of the storage layer (VMAX) 706. The system ensures that the desired number of paths exist between the UCS 702 and the array 708 and that the ports 750 used on the array minimize the number of single-points-of-failure. That is, if a component on the array goes down, it is unlikely that it will impact all zoning paths. For example, if a single port goes down, there will be 3 remaining ports to take up the load. Any of the FRUs containing the affected port can be replaced without service interruption. If any FRU goes down (whether it be a port group, a director or an entire engine, or even a whole switch) traffic will not fail, and the component can be hot-swapped without service interruption. If, on the other hand, all four paths went through the same switch and the same port group, one failure would take down the entire service.

Figure 8:
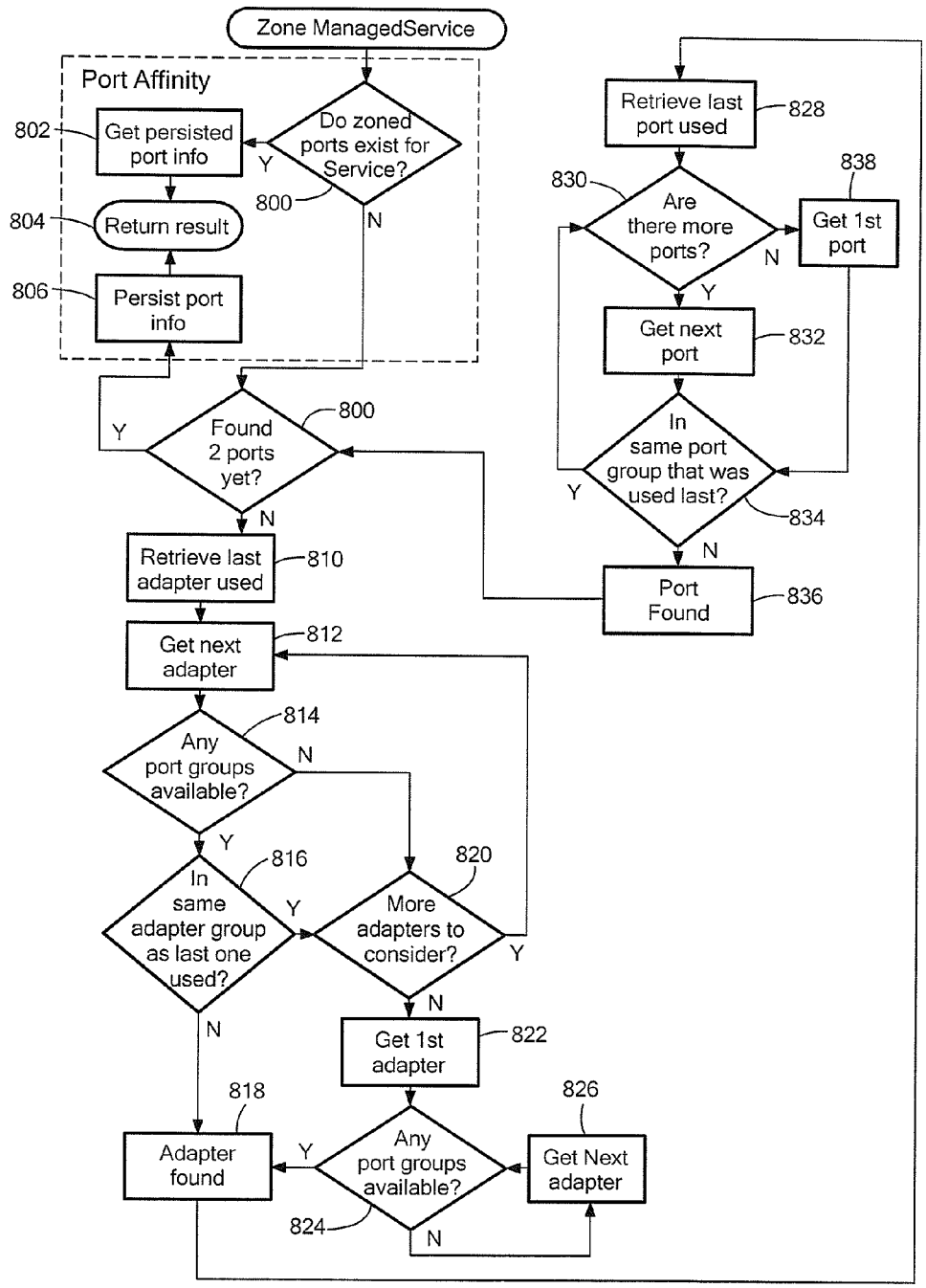
FIG. 8 is a flow diagram of an exemplary sequence of steps to assign ports for zoning.

FIG. 8 shows an exemplary sequence of steps for optimal topology zoning to minimize single-points-of-failure in accordance with exemplary embodiments of the invention. In step 800, it is determined whether zoned ports exist for this service. If so, in step 802, the persisted port information is retrieved and in step 804, the port results are returned to complete the process.

If the zoned port information did not exist, as determined in step 800, in step 808 it is determined whether two ports have been found. It is understood that if ports do not already exist, then a loop is entered and repeated until two ports have been found. When it first runs, no ports could have been already zoned, so the zoning algorithm runs, returns to the beginning, and repeats until the desired number of ports have been found. In this implementation, the desired number of zones is 4: 2 zones for each fabric and processing runs once for each fabric.

Once the desired number of ports have been found, the information is persistently stored in step 806 (port affinity). If not, in step 810, the last adapter used to assign zones to is retrieved. In step 812, the system gets the next adapter and in step 814 determined whether any port groups are available. If so, in step 816, it is determined whether the port group is the same port group as the last one used. If not, processing continues in step 818 to adapter found.

If no port groups were found to be available in step 814, in step 820 it is determined whether there are more adapters to consider. If so, processing continues in step 812. If not, in step 822 the system retrieves the first adapter and in step 824 determines whether any port groups are available. If so, processing continues to step 818. If not, in step 826 the next adapter is retrieved. It is assumed that there is at least one port group with an active port, else no zoning can take place.

From step 818, processing continues in step 828 to retrieve the last port used and in step 830 determine whether there are more ports. If so, in step 832 the system gets the next port and in step 834 determines whether the port is in the same port group as the port group that was used last. If not, in step 836 the port is found. If so, processing continues in step 830. If in step 830, it was determined that there were no more ports, in step 838, the first port was retrieved, and processing continues in step 834. From step 836, processing continues in step 808 to continue the process.

Referring again to step 808, the system has the desired number of ports. Processing continues until there is the desired number to ensure there are a sufficient number of paths. Load-balancing is guaranteed since by locating ports in other port groups and other adapters, which spreads the load out across different components and FRUs. With only one FRU and/or only one port group or adapter, load-balancing does not occur.

It is understood that processing locates storage ports for a given host port so the system locates two storage ports on different FRUs/Adapters. The system is locating storage ports for a single host port or HBA. The system finds zone members, which are pairs of ports. Each zone member is made up the host port under consideration and one of the storage ports to be located. In the above description, it is understood that the term "last" refers to the last port/adapter used to create a zone member (so it is not reused).

Figure 9:
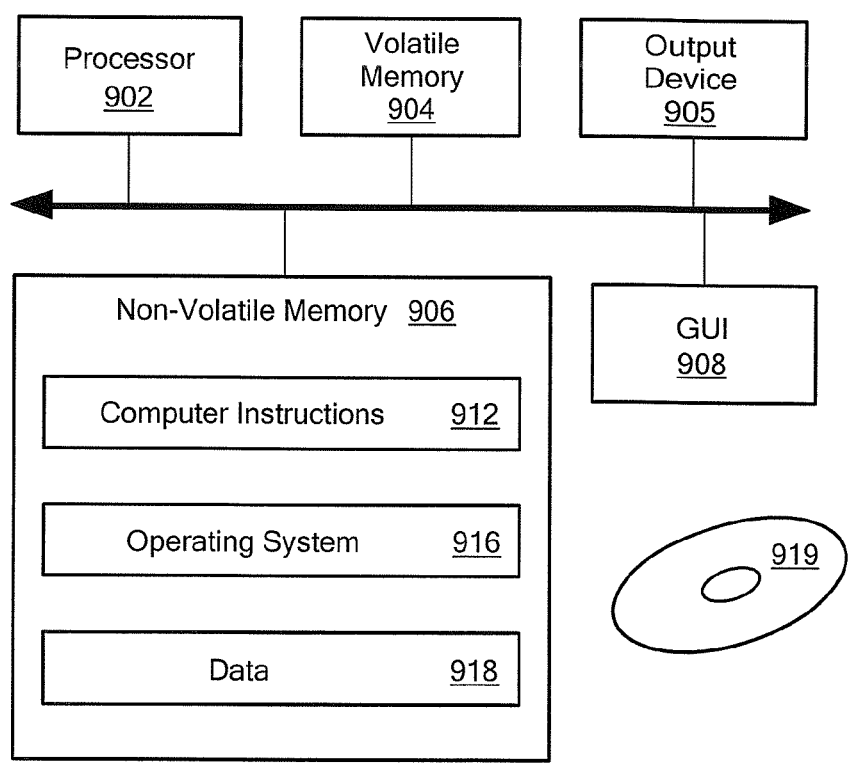
FIG. 9 is a schematic representation of a computer that can perform at a portion of processing described herein.

Referring to FIG. 9, a computer includes a processor 902, a volatile memory 904, an output device 905, a non-volatile memory 906 (e.g., hard disk), and a graphical user interface (GUI) 908 (e.g., a mouse, a keyboard, a display, for example). The non-volatile memory 906 stores computer instructions 912, an operating system 916 and data 918, for example. In one example, the computer instructions 912 are executed by the processor 902 out of volatile memory 904 to perform all or part of the processing described above. An article 919 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
   creating zones for ports from a storage layer to a compute layer both coupled to a storage area network switch, wherein the storage layer includes ports in field replaceable unit (FRU) port groups, the port groups in FRU adapters, and the adapters in FRU adapter groups;
   creating a first zone; and
   creating a second zone immediately after the first zone by:
      identifying a storage adapter that is not in the last adapter group used for the first zone; and
      identifying a storage port that is not in the last port group used for the first zone.

2. The method according to claim 1, further including creating the first and second zones to load balance data traffic.

3. The method according to claim 1, further including creating the first and second zones in an infrastructure provisioning module of a unified infrastructure manager (UIM).

4. The method according to claim 1, wherein the compute layer includes fabric interconnects.

5. The method according to claim 4, wherein the network layer includes SAN switches.

6. The method according to claim 1, wherein the storage ports share LUNs.

7. The method according to claim 1, further including persistently storing port assignments for port affinity.

8. The method according to claim 1, further including selecting a desired number of paths between the computer layer and the storage layer.

9. The method according to claim 8, further including selecting the desired number of paths between the compute layer and the storage layer to minimize a number of single-points-of-failure.

10. An article, comprising:
    a computer readable medium having non-transitory stored instructions that enable a machine to perform:
    creating zones for ports from a storage layer to a compute layer both coupled to a storage area network switch, wherein the storage layer includes ports in field replaceable unit (FRU) port groups, the port groups in FRU adapters, and the adapters in FRU adapter groups;
    creating a first zone;
    creating a second zone immediately after the first zone by:
    identifying a storage adapter that is not in the last adapter group used for the first zone; and
    identifying a storage port that is not in the last port group used for the first zone.

11. The article according to claim 10, further including instructions for creating the first and second zones to load balance.

12. The article according to claim 10, wherein the network layer includes fabric interconnects.

13. The article according to claim 12, wherein the network layer includes SAN switches.

14. The article according to claim 10, further including instructions for persistently storing port assignments for port affinity.

15. The article according to claim 10, further including instructions for selecting a desired number of paths between the computer layer and the storage layer.

16. The article according to claim 15, further including instructions for selecting the desired number of paths between the computer layer and the storage layer to minimize a number of single-points-of-failure.

17. A system, comprising:
a compute layer;
a storage layer;
a network layer between the compute layer and the storage layer; and
a management layer comprising stored instructions to enable the system to:
create zones for ports from the storage layer to the compute layer, wherein the storage layer includes ports in field replaceable unit (FRU) port groups, the port groups in FRU adapters, and the adapters in FRU adapter groups;
create a first zone;
create a second zone immediately after the first zone by:
identify a storage adapter that is not in the last adapter group used for the first zone; and
identify a storage port that is not in the last port group used for the first zone.

18. The system according to claim 17, wherein port assignments for the second zone are persistently stored for port affinity.

19. The system according to claim 17, wherein a desired number of paths between the computer layer and the storage layer are selected to minimize a number of single-points-of-failure.

* * * * *